United States Patent
Yoshinari et al.

(10) Patent No.: US 7,680,010 B2
(45) Date of Patent: Mar. 16, 2010

(54) METHOD FOR RECORDING INFORMATION ON OPTICAL RECORDING MEDIUM

(75) Inventors: Jiro Yoshinari, Tokyo (JP); Hideaki Miura, Tokyo (JP); Hiroshi Shingai, Tokyo (JP)

(73) Assignee: TDK Corporation, Tokyo (JP)

( * ) Notice: Subject to any disclaimer, the term of this patent is extended or adjusted under 35 U.S.C. 154(b) by 999 days.

(21) Appl. No.: 11/407,993

(22) Filed: Apr. 21, 2006

(65) Prior Publication Data

US 2006/0245326 A1 Nov. 2, 2006

(30) Foreign Application Priority Data

Apr. 27, 2005 (JP) .............................. 2005-130184

(51) Int. Cl.
*G11B 7/00* (2006.01)

(52) U.S. Cl. ..................................... 369/59.11; 369/116

(58) Field of Classification Search .............. 369/59.11, 369/59.12, 116, 47.5, 275.2, 275.4
See application file for complete search history.

(56) References Cited

U.S. PATENT DOCUMENTS

| | | | |
|---|---|---|---|
| 6,205,102 B1 * | 3/2001 | Spruit | 369/59.11 |
| 6,529,467 B2 * | 3/2003 | Miyamoto et al. | 369/116 |
| 6,560,182 B1 * | 5/2003 | Nagayama et al. | 369/59.12 |
| 6,751,513 B1 | 6/2004 | Spruit | |
| 6,999,392 B2 * | 2/2006 | Kato et al. | 369/59.11 |
| 2005/0063272 A1 | 3/2005 | Shingai et al. | |

FOREIGN PATENT DOCUMENTS

| | | |
|---|---|---|
| JP | A 11-120563 | 4/1999 |
| JP | A 11-167722 | 6/1999 |
| JP | A 2002-288837 | 10/2002 |
| JP | A-2004-30877 | 1/2004 |
| JP | A 2004-520675 | 7/2004 |
| JP | A-2005-71515 | 3/2005 |
| WO | WO 02/089121 A1 | 11/2002 |

* cited by examiner

*Primary Examiner*—Peter Vincent Agustin
*Assistant Examiner*—Kim-Kwok Chu
(74) *Attorney, Agent, or Firm*—Oliff & Berridge, PLC

(57) ABSTRACT

A method for recording information on an optical recording medium is provided so that it is satisfied that $0.16 \leq (L_v \times T_{cool})/(\lambda/NA) \leq 0.30$ and $0.06 \leq (L_v \times T_{top})/(\lambda/NA) \leq 0.14$, where $\lambda$ is a write wavelength of a laser beam used to irradiate the recording layer of a phase-change optical recording medium, NA is a numerical aperture of an objective lens used for irradiation with the laser beam, $L_v$ is a relative speed between the objective lens and the optical recording medium, $T_{cool}$ is a pulse time of a cooling pulse inserted immediately following a leading write pulse, and $T_{top}$ is a leading write pulse time. The method allows for forming a record mark with a good shape and prevents fluctuations at the front edge of the record mark, which would be otherwise caused by the recrystallization of the recording film being held at a high temperature.

4 Claims, 6 Drawing Sheets

(A)

(B)

(C)

(A)

(B)

(C)

METHOD FOR RECORDING INFORMATION ON OPTICAL RECORDING MEDIUM

BACKGROUND OF THE INVENTION

1. Field of the Invention

The present invention relates to a method for recording information on a phase-change optical recording medium.

2. Description of the Related Art

In optical storage media such as DVDs (Digital Versatile Discs), write data is modulated into a length of a record mark along the track of the recording layer and then recorded with the length of a record mark associated with a time length of the write data (an integral multiple of T or nT), where T is the write channel clock cycle. For example, CD-RWs (Compact Disc Rewritable) employ the EFM modulation scheme, so that data to be written is modulated into a record mark having any one of lengths 3T to 11T for recording.

Those optical storage media as mentioned above often employ phase-change film for the recording layer, in the case of which the record mark portion has the phase-change film in an amorphous-state, and crystalline-state space portions are formed between each record mark.

To form the amorphous-state record mark portion, a crystalline portion is melted with a laser beam and then rapidly cooled. To form the crystalline-state portion, the phase-change film is irradiated with a laser beam in a manner such that the film is held for a certain period of time or longer at the crystallization temperature thereof or higher.

To achieve the amorphous-state, the phase-change film is irradiated with a laser beam, which includes a pulse train of a write pulse at write power and a cooling pulse generally at bottom power, to be thereby melted and then rapidly cooled. On the other hand, to achieve the crystalline-state, the phase-change film is irradiated with a laser beam at an erase power level. As a method for recording information on an optical recording medium, known is the mark edge recording scheme which is adapted for higher densities. To record information on a phase-change optical recording medium using the mark edge recording scheme, write and cooling pulses having a pulse width of 0.5T with respect to the write channel clock cycle T are employed.

In this case, each time the time length of write data is incremented by 1T, a set of a write pulse and a cooling pulse is to be added. Such a multi-pulse write waveform allows write data of different time lengths to be recorded always in constant heating and cooling conditions, thereby reducing an edge shift which is dependent on the time length of write data. Furthermore, to perform high-speed write operations using such a write waveform, the write channel clock frequency is made higher, e.g., two times or four times, at the same rate as the write linear speed, with the write waveform kept unchanged.

Thus, high-speed write operations may be performed by making the write channel clock frequency higher, e.g., two times or four times, with the write waveform kept unchanged. However, this results in the width of the write pulse and the cooling pulse being significantly reduced. It is thus difficult to attain the temperature and the cooling speed that are required to change the phase of the recording film. This causes a record mark to be insufficiently formed, thus raising a problem that a record mark of a correct mark length cannot be obtained.

Furthermore, in performing high-speed write operations, the turn-on time or the turn-off time of the semiconductor laser drive circuit may increase with respect to the write channel clock. In this case, for example, a 9T record mark may have a distorted write waveform when recorded. This will thus raise a problem that it is difficult to sufficiently heat and cool the phase-change optical recording medium, leading to a shorter record mark.

In contrast to this, according to the invention disclosed in Japanese Patent Laid-Open Publication No. 2002-288837, a record mark is formed using write laser light as multi-pulse light. This multi-pulse includes at least a leading write pulse and a trailing cooling pulse. A cooling pulse and a write pulse are inserted between the leading write pulse and the trailing cooling pulse as the time length of write data increases.

The set of cooling and write pulses to be inserted are adapted such that one additional set is inserted each time the data length of write data is increased by 2T in each case of n of the time length nT of write data being an odd number and an even number.

Here, as means for increasing the storage capacity of an optical recording medium, there is available a method of employing a multi-layered optical recording medium which has recording layers stacked in a plurality of layers. In such a multi-layered optical recording medium, a recording layer on which light is incident needs to be thin enough to be semi-transparent to light passing therethrough. It is thus difficult to provide a thick heat dissipating layer for dissipating heat generated in the recording layer when irradiated with write laser light. The recording layer will be thus configured to be only gradually cooled, but rapidly cooled or rapidly heated with great difficulty.

In such a recording layer configured to be gradually cooled, recrystallization will readily occur from a melted interface portion of the recording film when a record mark is formed. In particular, a recording film suitable to high-speed recording needs to be crystallized at a high speed, and will be thus also recrystallized easily in nature. As is known in the art, this recrystallization will cause an amorphous-state record mark to be contracted and a read signal to be less amplitude modulated. Additionally, this recrystallization will also cause noticeable recrystallization at the front edge portion of a record mark, and thus a change in the shape of the front edge portion results in a significant degradation in jitter characteristic of the read signal.

As a countermeasure against the recrystallization of record marks, disclosed in Published Japanese translation No. 2004-520675 of PCT application is an improved write pulse strategy for reducing heat accumulation in the recording film. According to this improvement, a record mark of nT is formed using m write pulses, where m is less than n, such that a longer cooling time between pulses is allowed to facilitate heat dissipation from the recording film and thus reduce heat accumulation.

Furthermore, the write strategy (2T strategy) disclosed in Japanese Patent Laid-Open Publication No. 2002-288837 mentioned above is to form a record mark of nT using n/2 write pulses, and is thus covered by the write strategy disclosed in Published Japanese translation No. 2004-520675 of PCT application. However, the 2T strategy is effective at recording information on a multi-layered and high-speed recording optical recording medium.

On the other hand, as is known in the art, after an optical recording medium having a record mark formed thereon is held at a high temperature, overwriting a pre-storage record mark would cause jitter characteristics to degrade during reading. In contrast to this, the invention disclosed in Japanese Patent Laid-Open Publication No. Hei 11-167722 suggests that the post-storage write linear speed should be made slower than the optimal pre-storage write linear speed, thereby overwriting in an improved manner. However, in the case of high-speed recording, the optimal speed of writing on the recording film itself needs to be increased, and in consideration of balance between the write speed and the archiving characteristics, it is difficult to slow the post-storage write linear speed.

Using the 2T strategy as described above, information was read and written, for example, on a thin light-incident recording layer of a two-layered optical recording medium, and it was found that a good jitter characteristic was not obtained at the front edge of the record mark. Likewise, it was also found that performing read and write operations on an optical recording medium, after it has been written using the 2T strategy and held at a high temperature, would cause a further degradation in the jitter characteristic of the front edge portion of the record mark.

SUMMARY OF THE INVENTION

In view of the foregoing problems, various exemplary embodiments of this invention provide a method for recording information on an optical recording medium which can prevent degradation in jitter characteristic when additional read and write operations are performed after an optical recording medium having a record mark formed thereon has been held at a high temperature.

Various exemplary embodiments of this invention further provide a method for recording information on an optical recording medium which can prevent degradation in jitter characteristic of the front edge portion of a record mark when read and write operations are performed, using the 2T strategy, on the other-than most distant recording layer of a multi-layered optical recording medium from a recording layer on which light is incident.

After intensive studies, the inventor has found that it is possible to form a good record mark by controlling within a certain range the amount of overlap between laser beam spots of the leading write pulse and the following cooling pulse and the amount of overlap between laser beam spots during ON and OFF of the leading pulse.

In summary, the above-described objectives are achieved by the following aspects of the present invention.

(1) A method for recording information on an optical recording medium, the method comprising pulse-modulating a laser beam into a pulse train including at least a leading write pulse at write power and a trailing cooling pulse at generally bottom power, and allowing the laser beam to irradiate a recording layer of a phase-change optical recording medium, thereby modulating write data into a length of a record mark along a track of the recording layer, the length of the record mark being associated, for recording, with an integral multiple of T or nT, or a time length of the write data, where T is a write channel clock cycle, wherein: at least a set of a cooling pulse at generally bottom power and a write pulse at write power is inserted between the leading write pulse and the trailing cooling pulse; and it is satisfied that $0.16 \leq (L_v \times T_{cool})/(\lambda/NA) \leq 0.30$ and $0.06 \leq (L_v \times T_{top}/\lambda/NA) \leq 0.14$, where $\lambda$ is a write wavelength of the laser beam, NA is a numerical aperture of an objective lens used for irradiation with the laser beam, $L_v$ is a relative speed between the objective lens and the optical recording medium, $T_{cool}$ is a pulse time of a cooling pulse to be inserted immediately following the leading write pulse, and $T_{top}$ is a leading write pulse time.

(2) The method for recording information on an optical recording medium according to (1), wherein even when the time length of write data is either (2n+1)T or 2nT, where T is a write channel clock cycle, an additional set of the cooling pulse being one in number and the write pulse being one in number is inserted each time the time length of write data increases by 2T.

(3) A method for recording information on an optical recording medium, the optical recording medium being a multi-layered optical recording medium having a plurality of recording layers, wherein the method according to (1) or (2) is used to record on an other-than most distant recording layer from a recording layer on which light is incident.

The present invention provides an optimized overlap between the beam spots of a leading write pulse and the following pulse. This makes it possible to prevent part of a record mark formed by the leading write pulse from being erased as well as the amount of overlap between beam spots from being excessively reduced into a distorted mark shape and thereby causing a disturbance in a read signal. Furthermore, the invention allows for controlling the amount of overlap between the laser beam spots during ON and OFF of the leading write pulse, thereby ensuring that a record mark is formed in a good shape without the recording film being gradually cooled. The invention also allows for well controlling the shape of the record mark after the optical recording medium has been held at a high temperature.

DETAILED DESCRIPTION OF THE PREFERRED EMBODIMENTS

Now, a more detailed description will be given below to an exemplary embodiment of the present invention with reference to FIGS. 1 and 2.

An optical recording medium 10 of this exemplary embodiment for recording information according to a method for recording information on an optical recording medium is configured such that a first recording layer (L0 layer) 14, an intermediate transparent layer 16, a second recording layer (hereinafter referred to as a recording layer) 18 (L1 layer), and a light transmitting layer 20 are laminated in that order on a substrate 12.

Figure 1:
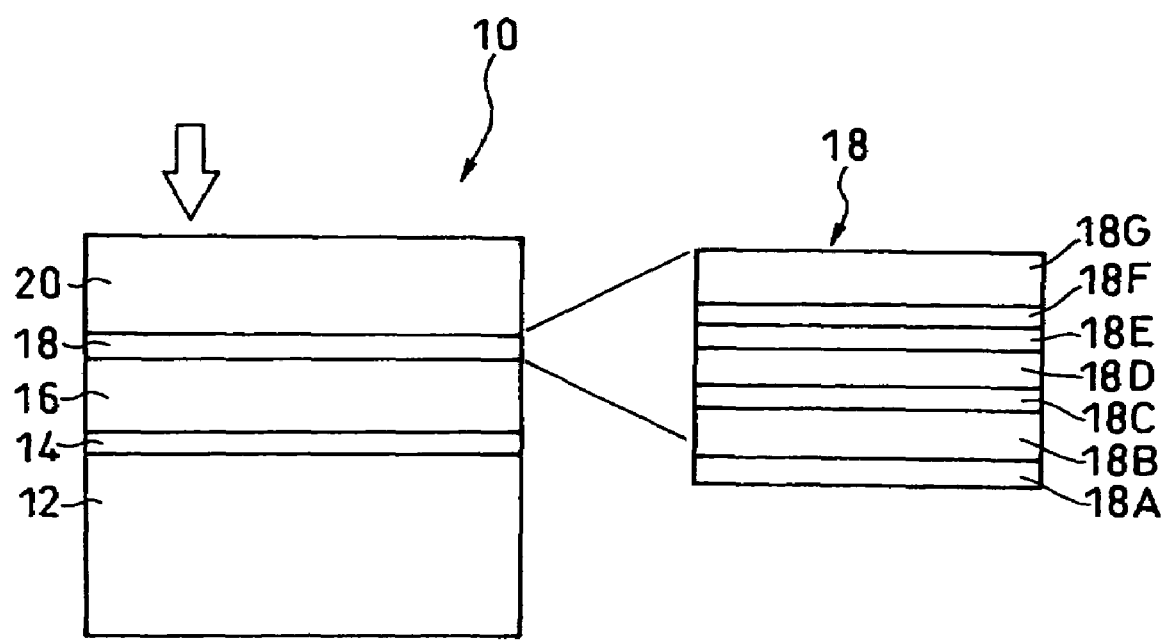
FIG. 1 is a schematic cross-sectional view showing an optical recording medium on which information is recorded in accordance with a method of an example of the present invention.

As illustrated under magnification in FIG. 1, the recording layer 18 is configured such that an underlying film 18A, a metal heat dissipation 18B, a second protective film 18C, a phase-change recording film (L1 recording film) 18D, and a first protective film 18E of a two-layered dielectric film and a heat dissipation film are laminated in that order on the intermediate transparent layer 16.

The heat dissipation film is provided for heat dissipation and optical interference, and formed of a material, preferably, an Ag alloy in such a thickness as to ensure an optical transmittance of 30% or more and 80% or less at a write wavelength.

Here, the recording layer 18 having an optical transmittance of less than 30% makes it difficult to write on the first recording layer 14, while the optical transmittance over 80% will make it difficult to write on the recording layer 18.

The phase-change recording film (L1 recording film) 18D is formed of a material, e.g., a SbTe eutectic alloy, which is capable of phase change between amorphous and crystalline. Its thickness is preferably 10 nm or less for the film to be semitransparent.

Figure 2:
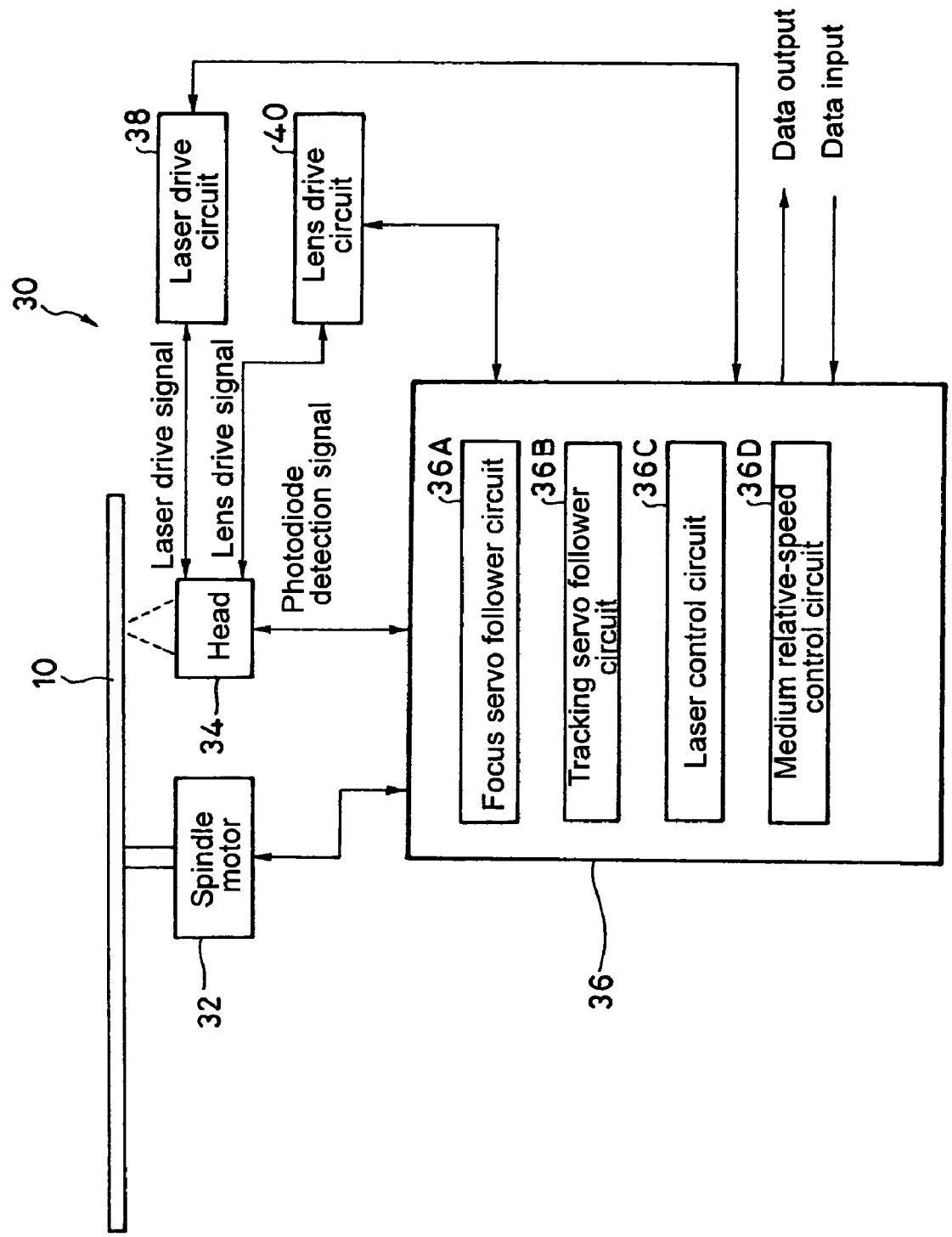
FIG. 2 is a block diagram showing an information read and write apparatus for carrying out a method of the present invention.

On the optical recording medium 10 configured as described above, an information read and write apparatus 30 as shown in FIG. 2 reads and writes information.

This information read and write apparatus 30 includes a spindle motor 32 for rotating the optical recording medium 10, a head 34 for irradiating the optical recording medium 10 with a laser beam, a controller 36 for controlling the head 34 and the spindle motor 32, a laser drive circuit 38 that supplies a laser drive signal for controllably modulating the laser beam from the head 34 into a pulse train, and a lens drive circuit 40 for supplying a lens drive signal to the head 34.

The controller 36 includes a focus servo follower circuit 36A, a tracking servo follower circuit 36B, a laser control circuit 36C, and a medium relative-speed control circuit 36D.

The laser control circuit 36C produces a laser drive signal to be supplied by the laser drive circuit 38. At the time of writing data, the circuit 36C produces an appropriate laser drive signal based on write condition setting information stored on the optical recording medium of interest. At the time of reading data, the circuit 36C produces a laser drive signal such that the laser beam has a predetermined power depending on the type of the optical recording medium of interest. Note that the predetermined power at the time of reading data is specified in accordance with read condition setting information.

Furthermore, the medium relative-speed control circuit 36D is capable of controlling the relative speed $L_v$ of the optical recording medium 10 with respect to the head 34.

The write condition setting information refers to information for identifying various conditions that are required to write data on the optical recording medium 10. In this exemplary embodiment, the write condition setting information includes at least information required to determine the power of a laser beam at the time of writing and the write strategy, which will be detailed below.

The write condition setting information includes not only information that specifically indicates each condition necessary for writing data but also information for identifying write conditions by specifying any one of various conditions that are pre-stored in the information read and write apparatus.

More specifically, in this exemplary embodiment, the laser power at the time of writing includes, as the write condition setting information, write power (the power during a write pulse) Pw (see FIG. 3) for melting the phase-change recording film into an amorphous state, bottom power (the power during a cooling pulse) Pb for cooling it, and erase power Pe for turning the phase-change recording film into a crystalline state, with a relation that Pw>Pe>Pb.

The laser beam at the time of writing is pulse-modulated into a pulse train, which includes a write pulse, a cooling pulse, and an erase pulse each at the aforementioned laser power, is used to irradiate the recording layer. Those settings such as for the number of pulses then modulated, the pulse width, and the pulse interval, and the power are referred to as the write strategy.

Figure 3:
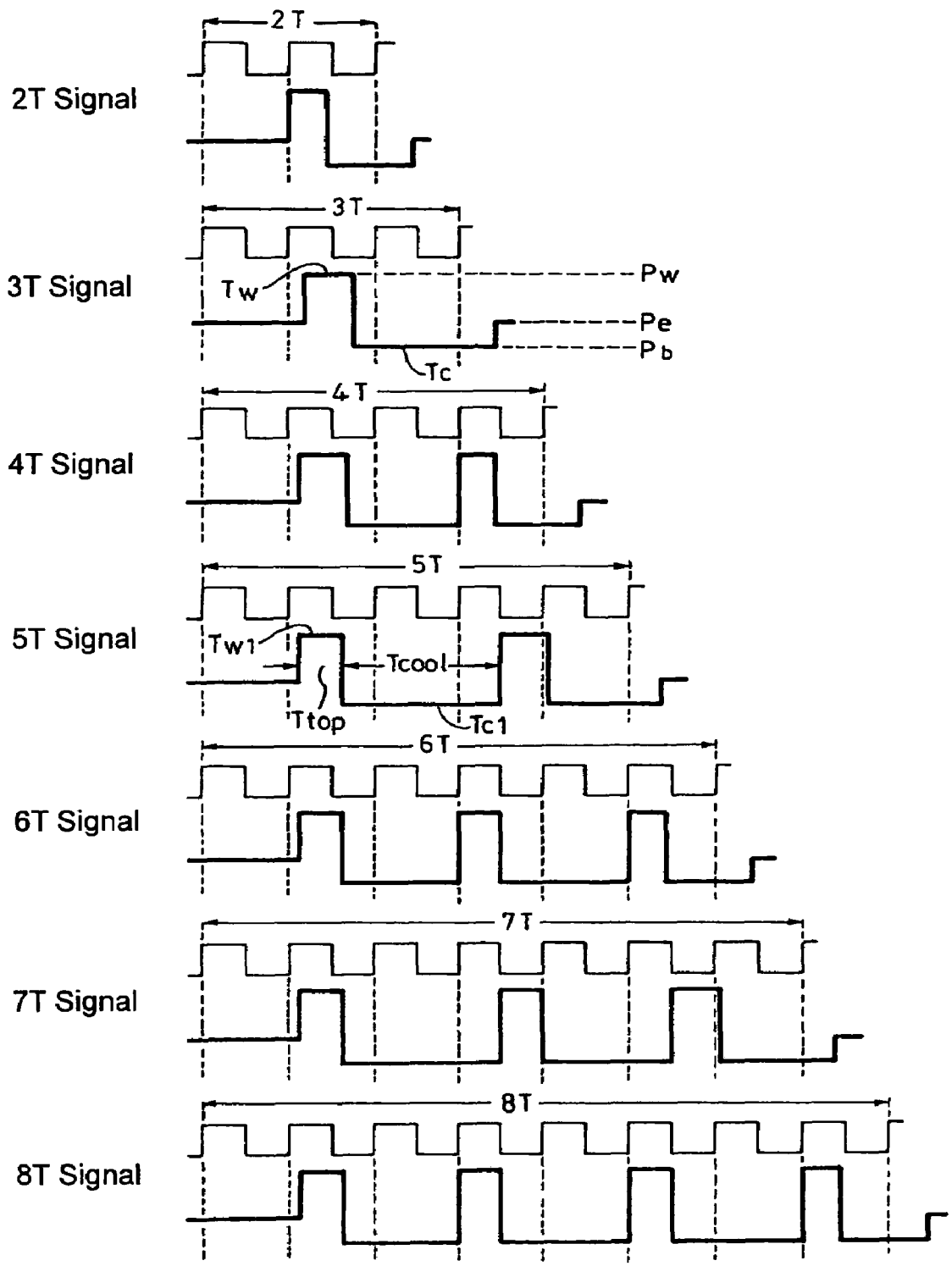
FIG. 3 is a diagram showing a write strategy according to the embodiment.

In the write strategy of this exemplary embodiment, as shown in FIG. 3, the write pulse Tw and the cooling pulse Tc are alternately used for irradiation. Here, both Tw and Tc indicate the pulse width (or time) but, for convenience in explanation, they are employed to indicate the pulses. Furthermore, data to be written is modulated into a length of a record mark along the track of the recording layer, and recorded with the length of a record mark associated with an integral multiple of T, where T is one clock cycle.

FIG. 3 shows the write strategy of this exemplary embodiment. In FIG. 3, the channel clock of signals for writing 2T to 8T record marks, respectively, according to the 1.7RLL modulation scheme is shown in the upper row, while the write strategy is shown in the lower row.

This write strategy is adapted such that 2nT and (2n+1)T record marks corresponding to 2nT and (2n+1)T are recorded each using n write pulses and cooling pulses, where n is 1, 2, 3, 4, . . . . Furthermore, the write strategy is specified such that $0.16 \leq (L_v \times T_{cool})/(\lambda/NA) \leq 0.30$ and $0.06 \leq (L_v \times T_{top})/(\lambda/NA) \leq 0.14$, where $\lambda$ is the write wavelength of the laser beam, NA is the numerical aperture of the objective lens (not shown) of the recording optics in the aforementioned head 34, $L_v$ is the relative speed between the head 34 and the optical recording medium 10, $T_{cool}$ is the pulse time of a cooling pulse $T_{c1}$ inserted immediately following a leading write pulse $T_{w1}$, and $T_{top}$ is the leading write pulse time.

More specifically, the relative speed Lv is determined by the medium relative-speed control circuit 36D. Based on this numerical value, the controller 36 calculates $T_{top}$ and $T_{top}$ to meet the two equations shown above, and then the signals are delivered to the laser drive circuit 38.

In the foregoing, $\lambda/NA$ corresponds to the spot diameter of a laser beam on the recording film at the focal point of the laser beam; $L_v \times T_{cool}$ corresponds to the distance between the leading write pulse $T_{w1}$ and the following write pulse $T_{w2}$; and $L_v \times T_{top}$ corresponds to the light-emission heating distance of the leading write pulse $T_{w1}$.

Furthermore, $(L_v \times T_{cool})/(\lambda/NA)$ indicates the ratio of the laser beam spot diameter to the distance between the leading write pulse $T_{w1}$ and the following write pulse $T_{w2}$, i.e., the amount of overlap between the laser beam spots of the leading write pulse $T_{w1}$ and the following write pulse $T_2$.

Figure 4:
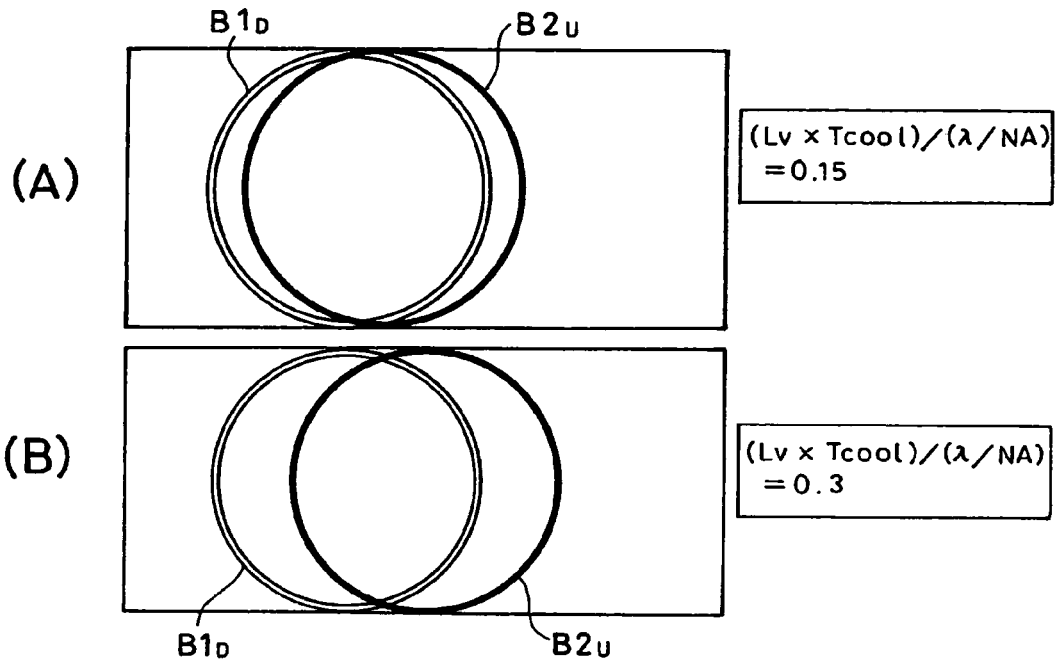
FIGS. 4(A) and 4(B) are schematic views showing the relative positional relation between the laser beam spots at the falling time of a top write pulse and at the rising time of the following write pulse, where the amount of overlap (or dislocation) therebetween is 0.15 and 0.3.

FIGS. 4(A) and 4(B) schematically show the amount of overlap between the beams of the leading write pulse $T_{w1}$ and the following write pulse $T_{w2}$. A symbol $B1_D$ indicates the position of the spot diameter of the laser beam at the falling time of the leading write pulse $T_{w1}$, while a symbol $B2_U$ indicates the position of the spot diameter of a laser beam at the rising time of the following write pulse $T_{w2}$. FIG. 4(A) shows a case of $(L_v \times T_{cool})/(\lambda/NA)=0.15$, while FIG. 4(B) shows a case of it equal to 0.3. When $(L_v \times T_{cool})/(\lambda/NA)$ is 0, the laser beam $B1_D$ and the beam $B2_U$ completely overlap each other. When it is greater than one, they are completely separated from each other. When it is equal to 0.5, they overlap each other by half.

This exemplary embodiment is adapted to control $L_v \times T_{cool}$ in a manner such that the amount of overlap between the two laser beams $B1_D$ and $B2_U$ is equal to 0.16 to 0.30.

Figure 5:
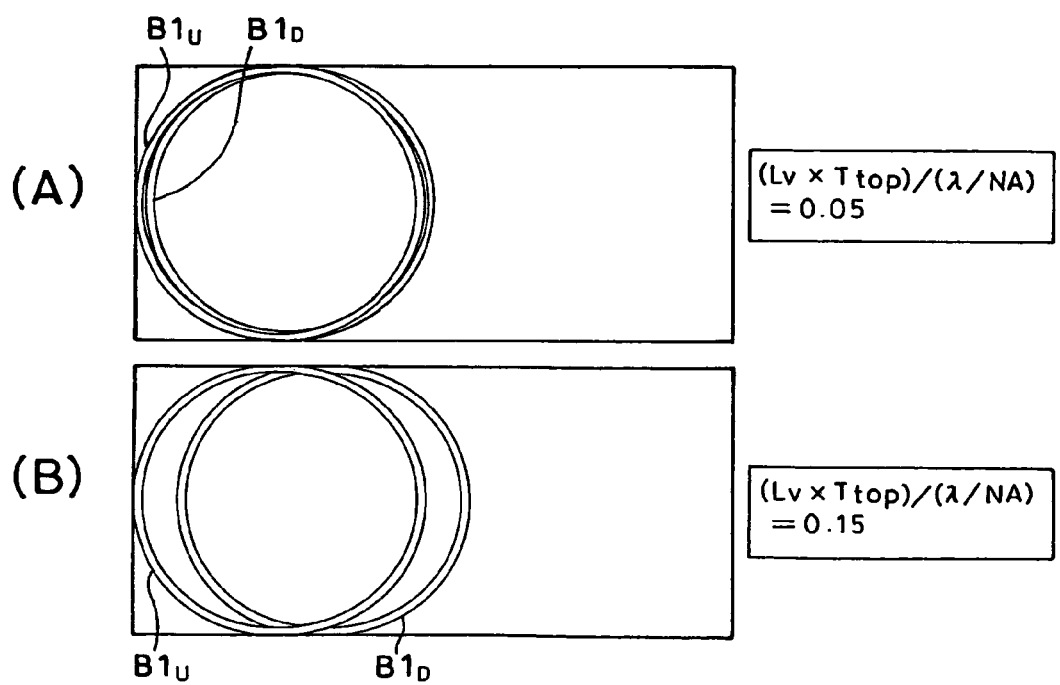
FIGS. 5(A) and 5(B) are schematic views showing those cases where the amount of overlap (or dislocation) between laser beam spots during ON and OFF of a leading write pulse is 0.05 and 0.15.

Furthermore, FIGS. 5(A) and 5(B) show the laser beam spot during ON of the leading write pulse $T_{w1}$ as $B1_U$ and the laser beam spot during OFF as $B1_D$. FIG. 5(A) shows a case of $(L_v \times T_{cool})/(\lambda/NA)=0.5$, while FIG. 5(B) shows a case of it equal to 0.15.

Figure 6:
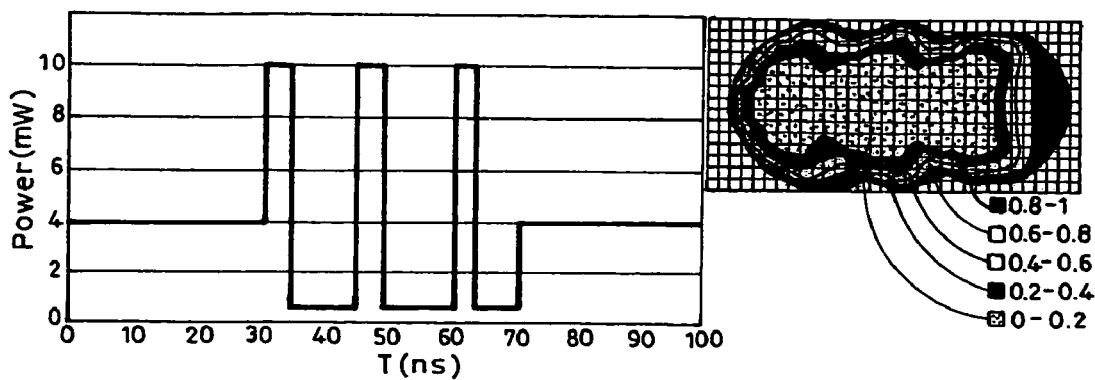
FIGS. 6(A) to 6(C) show, for comparison purposes, schematic views of a write strategy and a reflectance distribution of a 6T record mark on the L1 layer of an optical recording medium, on which information is recorded by the strategy, in accordance with a method of an exemplary embodiment of the present invention and a method of a comparative example.
Figure 6:
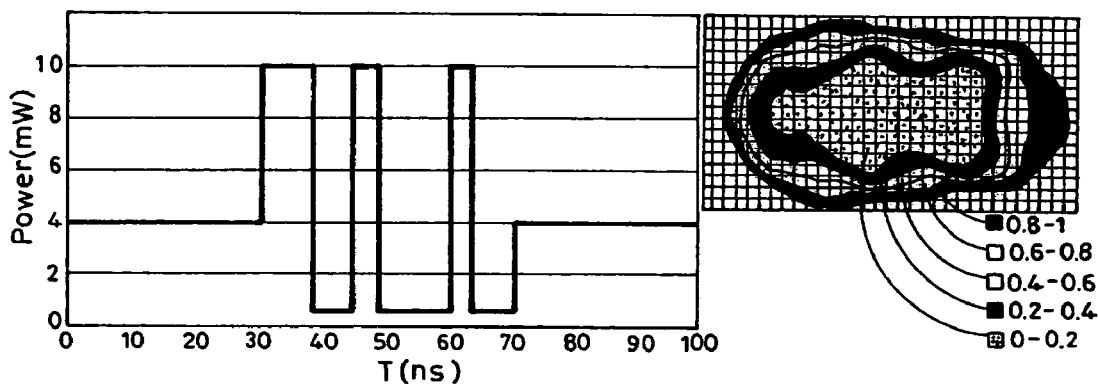
Figure 6:
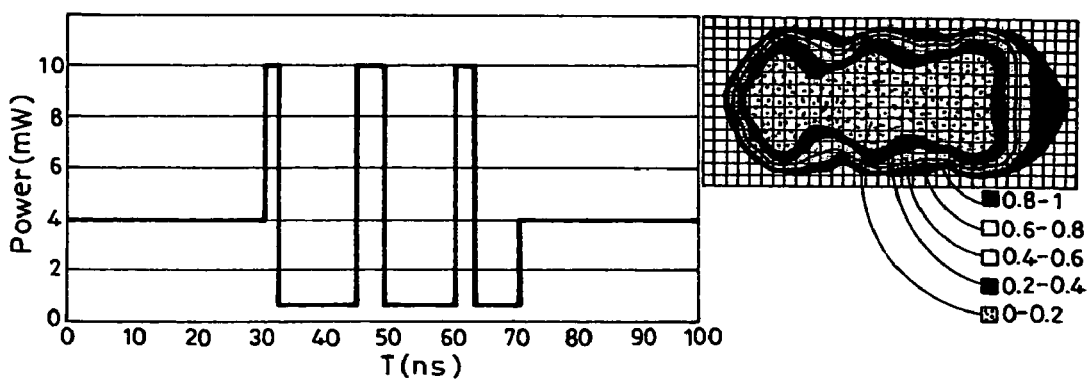
Figure 7:
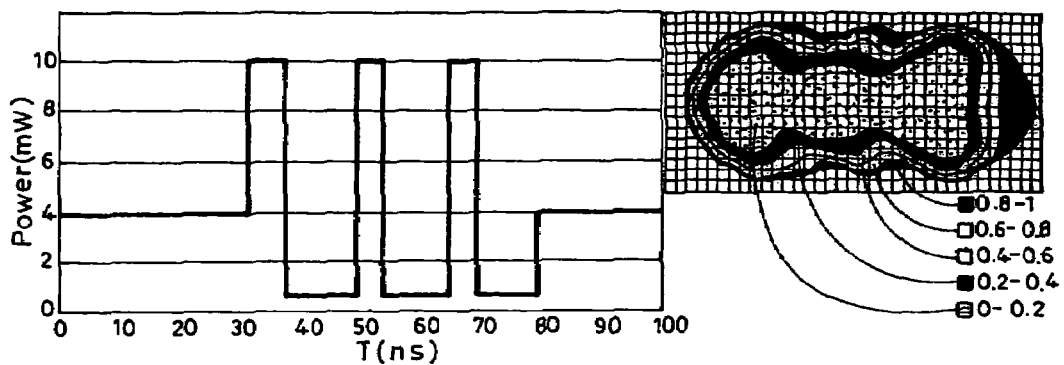
FIGS. 7(A) to 7(C) show schematic views, similar to those of FIGS. 6(A) to 6(C), showing a reflectance distribution of a 7T record mark in comparison with that of a record mark provided according a comparative example.
Figure 7:
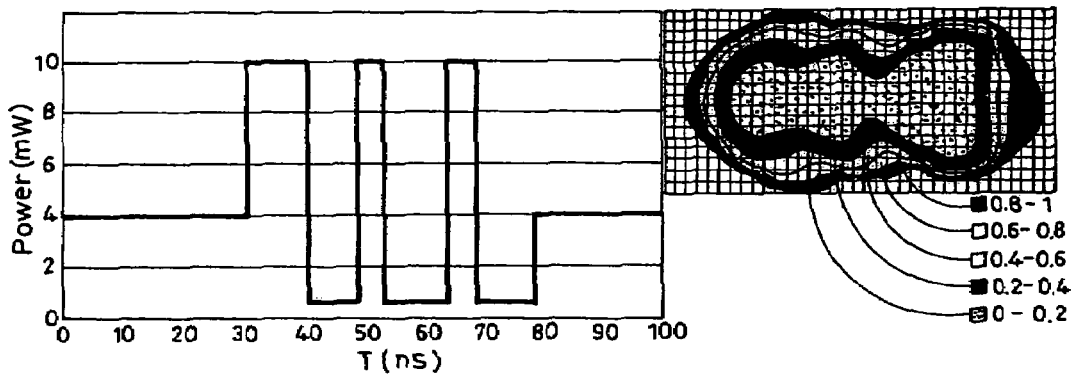
Figure 7:
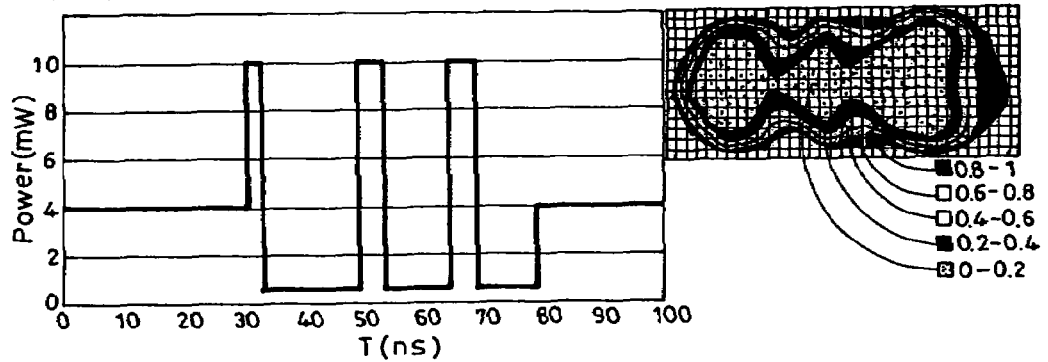

Furthermore, FIGS. 6(A) and 7(A) show the results of simulations performed on the crystallization distributions of a 6T mark and a 7T mark when the 6T and 7T marks are recorded on the second recording layer 18 according to the strategy of the aforementioned exemplary embodiment. Here, "1" in the figure indicates perfect crystalline, whereas "0" indicates perfect amorphous.

This simulation condition is shown in Table 1 for the L1 layer and a layer having the same film configuration as that of the L1 layer. The film of the L1 layer is configured such that the films of materials shown from bottom to top in the leftmost column of Table 1 are sequentially laminated from the substrate to the light-incident side. Here, in Table 1, the ratio 80:20 indicates the mole fraction of $ZnS:SiO_2$. Furthermore, "d" denotes the thickness of each film, $n_1$ denotes the refractive index, "k" denotes the extinction coefficient, "C" denotes the specific heat, and "K" denotes the thermal conductivity.

The substrate was formed of polycarbonate in a thickness of 1.1 mm and a diameter of 120 mm.

Then, the L0 layer was formed on the surface of the substrate having grooves formed thereon. To form the L0 layer, sputtering was performed to sequentially form a reflective film predominantly composed of Ag in a thickness of 100 nm, a dielectric film in a thickness of 20 nm, an L0 recording film predominantly composed of a phase change material including Sb, Te, and Ge in a thickness of 10 nm, a dielectric film predominantly composed of a mixture of ZnS and $SiO_2$ in a thickness of 40 nm, and a heat dissipation film predominantly composed of aluminum nitride in a thickness of 30 nm.

Then, an intermediate transparent layer of an ultraviolet curable acrylic resin composition was formed in a thickness of 25 μm on the L0 layer. At this time, the grooves are formed with a stamper on the intermediate transparent layer.

Then, the L1 layer was formed on the surface of the intermediate transparent layer. To form the L1 layer, sputtering was performed to sequentially form an underlying film predominantly composed of zirconium oxide in a thickness of 5 nm, a metal heat dissipation film predominantly composed of Ag in a thickness of 10 nm, a second protective film predominantly composed of zirconium oxide in a thickness of 4 nm, an L1 recording film including a phase change material of a Sb alloy predominantly composed of Sb, Ge and Mg in a

TABLE 1

| | | | d(nm) | $n_1$ | k | C(J/cm3/deg) | K(W/cm/deg) |
|---|---|---|---|---|---|---|---|
| L1 layer | cover | | | 1.56 | 0 | 1.512 | 0.00223 |
| | AlN | | 47 | 1.974 | 0.009 | 2.343 | 0.05 |
| | $ZnS:S_iO_2$(80:20) | First protective film 18E | 10 | 2.26 | 0 | 2.048 | 0.003 |
| | ZrO2 | | 5 | 2.283 | 0.012 | 2 | 0.007 |
| | Sb alloy phase-change recording film 18D | | 7 | 1.431 | 2.836 | 1.285 | 0.00582 |
| | $ZrO_2$ second protective film 18C | | 4 | 2.283 | 0.012 | 2 | 0.007 |
| | Ag metal heat dissipation film 18B | | 10 | 0.268 | 2.5 | 2.465 | 1.6 |
| | $ZrO_2$ underlying film 18A | | 5 | 2.283 | 0.012 | 2 | 0.007 |

As a result of the simulation under this simulation condition, the write strategy of this exemplary embodiment was able to provide a record mark with a good mark shape. However, as shown in FIGS. 6(B) and 7(B), when $(L_v \times T_{cool})/(\lambda/NA)$ is less than 0.16, the amount of overlap between the beam spots is too large, thereby causing the leading edge portion of the record mark formed by the leading write pulse $T_{w1}$ to be erased. On the other hand, when it is greater than 0.30, the amount of overlap between the beam spots is too small, thereby causing the record marks to be formed not uniformly. Thus, as shown in FIGS. 6(C) and 7(C), these results in the marks being constricted in shape, thereby causing the read signal to be disturbed.

Furthermore, when $(L_v \times T_{cool})/(\lambda/NA)$ is less than 0.06, the duration of ON is too short and thus the marks are not formed in a good shape. When it is greater than 0.14, the amorphous mark formed during ON of the leading write pulse $T_{w1}$ is gradually cooled due to the laser beam spot being dislocated by the time of OFF, causing the front edge of the record mark to be easily recrystallized. Thus, as shown in FIG. 7(B), this causes the front edge of the record mark to be distorted in shape and the read signal to be degraded.

Example 1

To begin with, an optical recording medium sample 1 was created as follows.

thickness of 7 nm, a dielectric film predominantly composed of zirconium oxide in a thickness of 5 nm, a dielectric film predominantly composed of a mixture of ZnS and $SiO_2$ in a thickness of 10 nm, and a first protective film including a heat dissipation film predominantly composed of aluminum nitride in a thickness of 47 nm.

Then, a light transmitting layer of an ultraviolet curable acrylic resin component was formed in a thickness of 75 μm on the surface of the heat dissipation film of the L1 layer.

Then, using a semiconductor laser having a wavelength of 810 nm at an output of 500 mW, initialization processing was performed on the optical recording medium to crystallize the L0 recording film contained in the L0 layer and the L1 recording film contained in the L1 layer, thus completing the optical recording medium sample 1.

On the optical recording medium sample 1 completed as described above, a record mark was formed, and the clock jitter of its read signal was measured in the following manner.

For the purposes of recording and its evaluation, an optical recording medium evaluation device (product name DDU1000) by Pulstec Industrial Co., Ltd. was used.

The optical recording medium sample 1 was incorporated into the device, and kept rotated at a linear speed of $L_v$=9.8 m/sec. Meanwhile, using an objective lens having a numerical aperture NA of 0.85, the L1 recording film was irradiated via the light transmitting layer with a laser beam of a wavelength of 405 nm, whose power has been modulated in a predetermined pattern between the write power Pw and the bottom power Pb, at a channel clock frequency of 132 MHz and a channel bit length of 0.1175 μm/bit. Thus, record marks having time lengths 2T to 8T according to the 1.7RLL modulation scheme were randomly combined to record random signals once to ten times.

Then, the recorded random signals were read to measure the clock jitter (%) of the read signals. Here, 1T corresponds to 7.58 ns. Note that the write power Pw, the erase power Pe, the read power Pr, and the bottom power Pb of the laser beam were set respectively so as to provide the optimal recording characteristics.

Here, fluctuations σ of the read signals were determined using a time interval analyzer, so that the clock jitter was calculated by σ/T (where T is a one clock cycle).

A smaller clock jitter of the read signal is more preferable. Furthermore, the clock jitter that allows for writing and reading data without any error cannot be uniquely defined as it depends on the drive, but is less than 9.0%, and preferably 8.5% or less.

As the write strategy for the aforementioned recording, the 2T write strategy shown in FIG. 3 was employed. Furthermore, $T_{top}$ of the 2T and 3T signals were fixed to $T_{top2T}=7/16 \cdot T$ and $T_{top3T}=9/16 \cdot T$, respectively.

Furthermore, the write pulses other than the leading write pulse were set such that the intermediate pulse $T_{mp}\frac{1}{2} \cdot T$, and the trailing portion pulse $T_{lp}=7/16 \cdot T$ {2nT signal} and 9/16·T {(2n+1)T signal}. Here, 2n denotes an even number and (2n+1) denotes an odd number. The read jitter values for $T_{top}$ and $T_{cool}$ corresponding to write signals of 4T or more are shown in Table 2.

medium having more than two layers in a case of recording on a semitransparent recording layer other than the most distant recording layer (L0 layer) from the light-incident side.

What is claimed is:

1. A method for recording information on an optical recording medium, the method comprising pulse-modulating a laser beam into a pulse train including at least a leading write pulse at write power and a trailing cooling pulse at generally bottom power, and allowing the laser beam to irradiate a recording layer of a phase-change optical recording medium, thereby modulating the laser beam into a length of a record mark along a track of the recording layer, the length of the record mark being associated, for recording, with an integral multiple of T or nT, or a time length of write data, where T is a write channel clock cycle, a write wavelength of the laser beam is λ, a numerical aperture of an objective lens used for irradiation with the laser beam is NA, and a relative speed between the objective lens and the optical recording medium is $L_v$, wherein:

the method further comprises a step of inserting at least a set of a cooling pulse including a cooling pulse of a pulse time $T_{cool}$ immediately following the leading write pulse at generally bottom power and a write pulse at write power between the leading write pulse of a leading write pulse time $T_{top}$ and the trailing cooling pulse where $T_{cool}$ and $T_{top}$ satisfy that $0.16 \leq (L_v \times T_{cool})/(\lambda/NA) \leq 0.30$ and $0.06 \leq (L_v \times T_{top})/(\lambda/NA) \leq 0.14$.

2. The method for recording information on an optical recording medium according to claim 1, wherein

TABLE 2

| Ttop | Tcool Even number T | Tcool Odd number T | (LvTtop)/ (λ/NA) | (LvTcool Even number T)/ (λ/NA) | (LvTcool Odd number T)/ (λ/NA) | Initial jitter(%) | Post-storage jitter(%) |
|---|---|---|---|---|---|---|---|
| 4/16T | 26/16T | 34/16T | ×0.04 | 0.26 | ×0.33 | ×8.6 | ×10.2 |
| 6/16T | 24/16T | 32/16T | 0.06 | 0.24 | ×0.32 | 8.2 | ×8.9 |
| 8/16T | 22/16T | 30/16T | 0.08 | 0.22 | 0.30 | 7.0 | 8.4 |
| 10/16T | 20/16T | 28/16T | 0.10 | 0.20 | 0.28 | 7.1 | 8.1 |
| 12/16T | 18/16T | 26/16T | 0.12 | 0.18 | 0.26 | 7.3 | 7.9 |
| 14/16T | 16/16T | 24/16T | 0.14 | 0.16 | 0.24 | 7.7 | 8.2 |
| 16/16T | 14/16T | 22/16T | ×0.16 | ×0.14 | 0.22 | 8.3 | ×8.9 |

2n: Even number
(2n + 1): Odd number

Table 2 shows that both the 2nT signal and the (2n+1)T signal can provide good recording characteristics when it is satisfied that $0.16 \leq (L_v \times T_{cool})/(\lambda/NA) \leq 0.30$ and $0.06 \leq (L_v \times T_{cool})/(\lambda/NA) \leq 0.14$.

The optical recording medium sample 1 on which the recording was performed according to the implementation example 1 was held for 24 hours at 80° C. in a dry environment, and thereafter overwritten once to measure the jitter of its read signal.

The read jitter values for $T_{top}$ and $T_{cool}$ of the write signals of 4T or more then used are shown in the rightmost column of Table 1. This shows that both the 2nT signal and the (2n+1)T signal can provide good recording characteristics when it is satisfied that $0.16 \leq (L_v \times T_{cool})/(\lambda/NA) \leq 0.30$ and $0.06 \leq (L_v \times T_{cool})/(\lambda/NA) \leq 0.14$.

In the aforementioned exemplary embodiment, the information recording method according to the present invention was applied to the L1 layer of a two-layered optical recording medium. However, the present invention may also be applicable to a single-layer optical recording medium having a thin recording layer, or to a multi-layered optical recording even when the time length of write data is either (2n+1)T or 2nT, where T is a write channel clock cycle, an additional set of the cooling pulse being one in number and the write pulse being one in number is inserted each time the time length of write data increases by 2T.

3. A method for recording information on a multi layered optical recording medium having a plurality of recording layers, the method comprising pulse-modulating a laser beam into a pulse train including at least a leading write pulse at write power and a trailing cooling pulse at generally bottom power, and allowing the laser beam to irradiate a recording layer of a phase-change optical recording medium, thereby modulating the laser beam into a length of a record mark along a track of the recording layer, the length of the record mark being associated, for recording, with an integral multiple of T or nT, or a time length of the write data, where T is a write channel clock cycle, a write wavelength of the laser beam is λ, a numerical aperture of an objective lens used for irradiation with the laser beam is NA, and a relative speed between the objective lens and the optical recording medium is $L_v$, wherein:

in a case of recording on an other-than most distant recording layer from a recording layer on which the laser beam is incident, the method further comprises a step of inserting at least a set of a cooling pulse including a cooling pulse of a pulse time $T_{cool}$ immediately following the leading write pulse at generally bottom power and a write pulse at write power between the leading write pulse of a leading write pulse time $T_{top}$ and the trailing cooling pulse where $T_{cool}$ and $T_{top}$ satisfy that $0.16<(L_v \times T_{cool})/(\lambda/NA)<0.30$ and $0.06<(L_v \times T_{top})/(\lambda/NA)<0.14$.

4. The method for recording information on an optical recording medium according to claim 3, wherein even when the time length of write data is either $(2n+1)T$ or $2nT$, where T is a write channel clock cycle, an additional set of the cooling pulse being one in number and the write pulse being one in number is inserted each time the time length of write data increases by 2T.

* * * * *